United States Patent
Traynor et al.

(10) Patent No.: US 10,952,020 B2
(45) Date of Patent: *Mar. 16, 2021

(54) RADIO BASED LOCATION POWER PROFILES

(71) Applicant: Intel Corporation, Santa Clara, CA (US)

(72) Inventors: Kevin Traynor, Shannon (IE); Mark D. Gray, Shannon (IE)

(73) Assignee: Intel Corporation, Santa Clara, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 16/005,312

(22) Filed: Jun. 11, 2018

(65) Prior Publication Data

US 2018/0302750 A1   Oct. 18, 2018

Related U.S. Application Data

(63) Continuation of application No. 15/218,460, filed on Jul. 25, 2016, which is a continuation of application
(Continued)

(51) Int. Cl.
*H04W 4/02* (2018.01)
*H04W 4/029* (2018.01)
(Continued)

(52) U.S. Cl.
CPC ........... *H04W 4/023* (2013.01); *H04W 4/029* (2018.02); *H04W 8/18* (2013.01); *H04W 8/22* (2013.01);
(Continued)

(58) Field of Classification Search
CPC ....... H04W 4/023; H04W 8/18; Y02D 70/142
(Continued)

(56) References Cited

U.S. PATENT DOCUMENTS 7,200,397 B1   4/2007  Jones et al.
8,068,011 B1 * 11/2011  Sajadi ................ H04M 1/7253
                                                      340/10.4
(Continued)

FOREIGN PATENT DOCUMENTS

CN    101155361    4/2008
CN    101282264    10/2008
(Continued)

OTHER PUBLICATIONS

Advisory Action dated Dec. 4, 2017 for U.S. Appl. No. 15/218,460.
(Continued)

*Primary Examiner* — Nghi H Ly
(74) *Attorney, Agent, or Firm* — Green, Howard & Mugahl LLP

(57) ABSTRACT

Methods and systems of managing radio based power may include a mobile platform having a plurality of radios and logic to detect changes in location for the mobile platform. The logic may also deactivate at least one of the plurality of radios in response to the changes in location. The changes in location may be detected based on location information obtained from one or more active radios in the plurality of radios and connection losses with respect to active radios in the plurality of radios.

15 Claims, 2 Drawing Sheets

Related U.S. Application Data

No. 14/583,277, filed on Dec. 26, 2014, now Pat. No. 9,432,840, which is a continuation of application No. 13/173,586, filed on Jun. 30, 2011, now Pat. No. 9,380,452.

(51) Int. Cl.

| | | |
|---|---|---|
| *H04W 52/02* | (2009.01) | |
| *H04W 8/22* | (2009.01) | |
| *H04W 64/00* | (2009.01) | |
| *H04W 8/18* | (2009.01) | |
| *H04W 88/06* | (2009.01) | |
| *H04W 84/12* | (2009.01) | |
| *H04W 88/08* | (2009.01) | |

(52) U.S. Cl.
CPC ....... *H04W 52/0254* (2013.01); *H04W 64/00* (2013.01); *H04W 84/12* (2013.01); *H04W 88/06* (2013.01); *H04W 88/08* (2013.01); *Y02D 30/70* (2020.08)

(58) Field of Classification Search
USPC .......... 455/456.1, 456.3, 414.1, 414.2, 404.2
See application file for complete search history.

(56) References Cited

U.S. PATENT DOCUMENTS

| | | | |
|---|---|---|---|
| 9,380,452 B2* | 6/2016 | Traynor | H04W 52/0254 |
| 9,432,840 B2* | 8/2016 | Traynor | H04W 52/0254 |
| 9,953,101 B1* | 4/2018 | Walliser | G06F 16/9577 |
| 2002/0032039 A1 | 3/2002 | Kimata | |
| 2006/0063560 A1 | 3/2006 | Herle | |
| 2008/0151842 A1 | 6/2008 | Tysowski et al. | |
| 2009/0017826 A1 | 1/2009 | Shaheen | |
| 2009/0043501 A1 | 2/2009 | Lohi et al. | |
| 2009/0170519 A1* | 7/2009 | Wilhoite | H04M 3/42246 |
| | | | 455/436 |
| 2009/0252117 A1 | 10/2009 | Sherman et al. | |
| 2010/0184440 A1 | 7/2010 | Mao et al. | |
| 2010/0302009 A1 | 12/2010 | Hoeksel et al. | |
| 2011/0222523 A1 | 9/2011 | Fu et al. | |
| 2011/0286437 A1* | 11/2011 | Austin | H04W 4/02 |
| | | | 370/338 |
| 2013/0005353 A1 | 1/2013 | Traynor et al. | |

FOREIGN PATENT DOCUMENTS

| | | |
|---|---|---|
| CN | 101868006 | 10/2010 |
| CN | 101895869 | 11/2010 |
| EP | 1782640 | 4/2012 |
| JP | H11186955 | 9/1999 |
| JP | 2001224050 | 8/2001 |
| JP | 2001338390 | 12/2001 |
| JP | 2002290308 | 10/2002 |
| JP | 3427063 | 7/2003 |
| JP | 2004221730 | 8/2004 |
| JP | 2004282301 | 10/2004 |
| JP | 2006135727 | 5/2006 |
| JP | 2006287644 | 10/2006 |
| JP | 3863728 | 12/2006 |
| JP | 2009182656 | 8/2009 |
| JP | 2010087724 | 4/2010 |
| WO | 2006010168 | 2/2006 |
| WO | 2013003725 | 1/2013 |

OTHER PUBLICATIONS

Final Office Action dated Jan. 26, 2017 for Korean Patent Application No. 10-2016-7006899.
Final Office Action dated Aug. 11, 2017 for U.S. Appl. No. 15/218,460.
Non-Final Office Action dated Mar. 24, 2017 for U.S. Appl. No. 15/218,460.
Notice of Allowance dated May 26, 2014 for Taiwan Patent Application No. 101119963.
Notice of Allowance dated May 26, 2016 for U.S. Appl. No. 13/173,586.
Notice of Allowance dated Jul. 11, 2017 for Japanese Patent Application No. 2014-517264.
Notification of Grant dated Jul. 20, 2017 for European Patent Application No. 12804086.2.
Office Action dated Feb. 9, 2015 for Korean Patent Application No. 10-2013-7034801.
Office Action dated Mar. 28, 2018 for Korean Patent Application No. 10-2017-7011402.
Office Action dated Jun. 15, 2016 for Korean Patent Application No. 10-2016-7006899.
Office Action dated Aug. 17, 2017 for Chinese Patent Application No. 201280028986.2.
Notice of Final Rejection for Korean Patent Application No. 10-2017-7011402, dated Mar. 28, 2018.
International Search Report and Written Opinion for International Application No. PCT/US2012/044938, dated Jan. 30, 2013, 9 pages.
International Preliminary Report on Patentability for International Application No. PCT/US2012/044938, dated Jan. 16, 2014, 6 pages.
Office Action for Taiwanese Patent Application No. 101119963, dated Feb. 18, 2014, 15 pages including 7 pages of English translation.
Office Action for Korean Patent Application No. 10-2013-7034801, dated Aug. 26, 2015, 6 pages including 3 pages of English translation.
Office Action for Japanese Patent Application No. 2014-517264, dated Sep. 29, 2015, 10 pages including 5 pages of English translation.
Office Action for Korean Patent Application No. 10-2013-7034801, dated Dec. 16, 2015, 6 pages including 3 pages of English translation.
Office Action for European Patent Application No. 12804086.2, dated Dec. 22, 2015, 4 pages.
Office Action for Japanese Patent Application No. 2014-517264, dated Feb. 3, 2015, 8 pages including 4 pages of English translation.
Extended European Search Report received for European Patent Application No. 12804086.2, dated Dec. 9, 2014, 7 pages.
Non-Final Office Action for U.S. Appl. No. 13/175,586, dated May 30, 2014, 21 pages, United States Patent and Trademark Office.
Final Office Action for U.S. Appl. No. 13/175,586, dated Oct. 29, 2014, 15 pages, United States Patent and Trademark Office.
Advisory Action for U.S. Appl. No. 13/175,586, dated Jan. 23, 2015, 3 pages, United States Patent and Trademark Office.
Notice of Allowance for U.S. Appl. No. 13/175,586, dated Mar. 17, 2015, 7 pages, United States Patent and Trademark Office.
Notice of Allowance for U.S. Appl. No. 13/175,586, dated Sep. 11, 2015, 7 pages, United States Patent and Trademark Office.
Non-Final Office Action or U.S. Appl. No. 14/583,277, dated Mar. 2, 2015, 9 pages, United States Patent and Trademark Office.
Final Office Action for U.S. Appl. No. 14/583,277, dated Aug. 5, 2015, 10 pages, United States Patent and Trademark Office.
Notice of Allowance for U.S. Appl. No. 14/583,277, dated Nov. 9, 2015, 11 pages, United States Patent and Trademark Office.
Notice of Allowance for U.S. Appl. No. 14/583,277, dated Apr. 26, 2016, 15 pages, United States Patent and Trademark Office.
Office Action for Korean Patent Application No. 10-2016-0036073, dated Jun. 15, 2016, 8 pages including 3 pages of English translation.
Office Action for Chinese Patent Application No. 201280028986.2, dated Jul. 7, 2016, 11 pages including 6 pages of English translation.
Office Action for U.S. Appl. No. 13/173,586, dated May 30, 2014, 13 pages.
Final Office Action for U.S. Appl. No. 13/173,586, dated Oct. 29, 2014, 15 pages.
Notice of Allowance for U.S. Appl. No. 13/173,586, dated Mar. 17, 2015, 7 pages.
Notice of Allowance for U.S. Appl. No. 13/173,586, dated Sep. 11, 2015, 7 pages.

(56) References Cited

OTHER PUBLICATIONS

Office Action for U.S. Appl. No. 14/583,277, dated Mar. 2, 2015, 9 pages.
Final Office Action for U.S. Appl. No. 14/583,277, dated Aug. 5, 2015, 11 pages.
Notice of Allowance for U.S. Appl. No. 14/583,277, dated Nov. 9, 2015, 7 pages.
Notice of Allowance for U.S. Appl. No. 14/583,277, dated Apr. 26, 2016, 7 pages.
Office Action for Japanese Patent Application No. 2014-517264, dated Dec. 20, 2016, 6 pages including 3 pages of English translation.
Office Action for Korean Patent Application No. 10-2016-7006899, dated Jan. 16, 2017, 6 pages including 3 pages of English translation.
Office Action for Chinese Patent Application No. 201280028986.2, dated Jan. 26, 2017, 20 pages including 8 pages of English translation.
Office Action for Korean Application No. 10-2017-7011402, dated Aug. 17, 2017, 9 pages including 4 pages of English translation.
Notice of grant for Chinese Patent Application No. 201280028986.2, dated Nov. 1, 2017, 4 pages including 2 pages of English translation.
Notice of Allowance for U.S. Appl. No. 15/218,460, dated Jun. 8, 2018.
Notice of Allowance dated Oct. 29, 2019 for Korean Patent Application No. 10-2017-7011402.

\* cited by examiner

RADIO BASED LOCATION POWER PROFILES

CROSS-REFERENCE TO RELATED APPLICATIONS

The application is a continuation of, and claims priority to, U.S. patent application Ser. No. 15/218,460, filed Jul. 25, 2016, issued as U.S. Pat. No. 10,097,954 on Oct. 9, 2018, and titled "RADIO BASED LOCATION POWER PROFILES" which is a continuation of, and claims priority to, U.S. patent application Ser. No. 14/583,277, filed Dec. 26, 2014, issued as U.S. Pat. No. 9,432,840 on Aug. 30, 2016, and titled "RADIO BASED LOCATION POWER PROFILES", which is a continuation of, and claims priority to U.S. patent application Ser. No. 13/173,586, filed on Jun. 30, 2011, issued as U.S. Pat. No. 9,380,452 on Jun. 28, 2016, and titled "RADIO BASED LOCATION POWER PROFILES", all of which are incorporated by reference in their entirety.

BACKGROUND

Technical Field

Embodiments generally relate to power management in mobile platforms. More particularly, embodiments relate to conserving power by automatically deactivating and activating mobile platform radios.

Discussion

Mobile platforms such as smartphones and tablets may include multiple radios that provide off-platform communication for various purposes. For example, a single smartphone may include both a cellular radio for voice and/or data communications, and a Wi-Fi (e.g., Institute of Electrical and Electronics Engineers/IEEE 802.11-2007, Wireless Local Area Network/LAN Medium Access Control (MAC) and Physical Layer (PHY) Specifications) radio for data communications. There may be occasions (e.g., when the smartphone is in transit), however, when a Wi-Fi access point is unavailable and the Wi-Fi radio is not used for communications. In such a case, the Wi-Fi radio might remain activated and could continue to draw power—particularly in scanning mode—unless it is manually deactivated by the user.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include a non-transitory computer readable storage medium including a set of instructions which, if executed by a processor, cause a system to detect a change in location for a mobile platform having a plurality of radios. The instructions may also cause a system to deactivate at least one of the plurality of radios in response to the change in location.

Embodiments may also include a mobile platform having a plurality of radios and logic to detect a change in location for the mobile platform. The logic can also deactivate at least one of the plurality of radios in response to the change in location.

In addition, embodiments can include an apparatus having logic to detect a change in location for a mobile platform having a plurality of radios. The logic may also deactivate at least one of the plurality of radios in response to the change in location.

Figure 1:
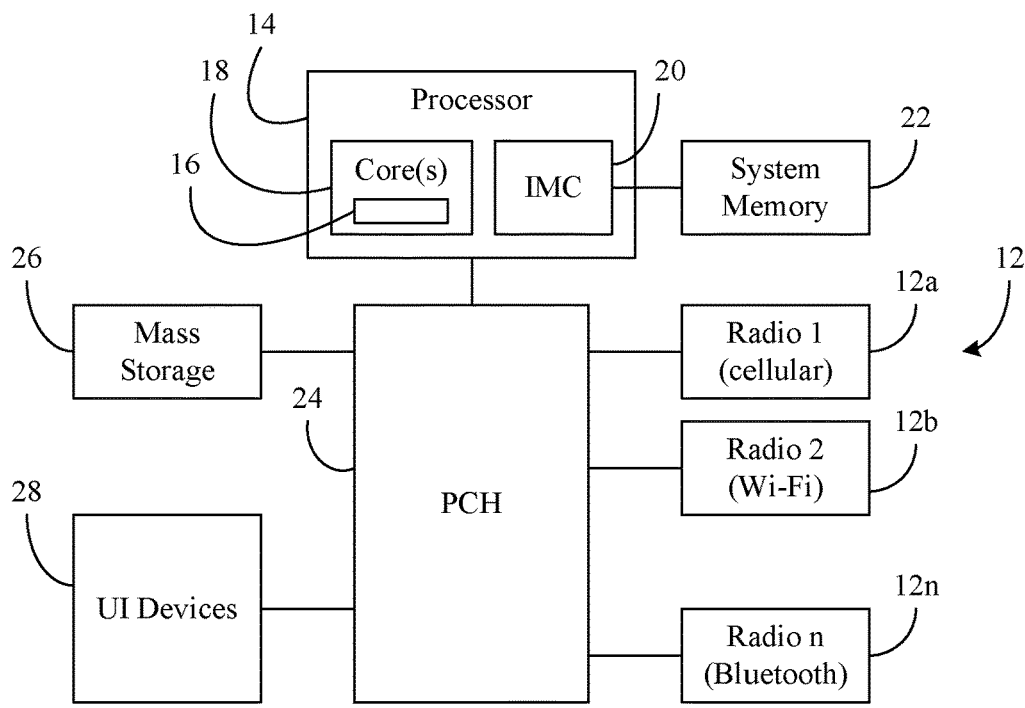
FIG. 1 is a block diagram of an example of a mobile platform according to an embodiment.

Turning now to FIG. 1, a mobile platform 10 having a plurality of radios 12 (12a-12n) is shown. The illustrated mobile platform 10 may be part of a system such as a mobile Internet device (MID), personal digital assistant (PDA), wireless smartphone, media player, notebook computer, tablet device, and so forth, wherein the mobile platform 10 may at times enter locations in which one or more of the radios 12 are not used for off-platform communications. Accordingly, the mobile platform 10 may include a processor 14 that includes/executes logic 16 to detect changes in location for the mobile platform 10, and to deactivate (e.g., power off), configure (e.g., place in a low power mode) and/or activate (e.g., power on) the radios 12 on an individual basis in response to the changes in location.

For example, a first radio ("Radio 1") could include a cellular (e.g., Third Generation/3G, Second Generation 2G, Global System for Mobile Communications/GSM, W-CDMA (UMTS), CDMA2000 (IS-856/IS-2000), etc.) radio 12a, a second radio ("Radio 2") could include a Wi-Fi radio 12b, and an $n^{th}$ ("Radio n") radio could include a Bluetooth (e.g., IEEE 802.15.1-2005, Wireless Personal Area Networks) radio 12n, wherein if it is determined that the mobile platform 10 has entered a location (e.g., car) that does not involve the use of the Wi-Fi radio 12b, then the Wi-Fi radio 12b can be automatically deactivated. Selectively deactivating the radios 12 and/or placing the radios 12 in a low power mode (e.g., reduced scanning mode) may provide substantial power savings and can extend the battery life of the mobile platform 10.

In particular, the processor 14 may include one or more processor cores 18 capable of executing a set of stored logic instructions and/or embedded logic, and an integrated memory controller (IMC) 20 configured to communicate with system memory 22. The system memory 22 could include, for example, dynamic random access memory (DRAM) configured as a memory module such as a dual inline memory module (DIMM), a small outline DIMM (SODIMM), etc. The mobile platform 10 may also include a platform controller hub (PCH) 24 (sometimes referred to as a Southbridge of a chipset), which may function as a host device and can communicate with the radios 12.

As already noted, the radios 12 could provide off-platform wireless communication functionality for a wide variety of purposes such as cellular telephone, Wi-Fi, Low-Rate Wireless PAN (e.g., IEEE 802.15.4-2006, LR-WPAN), Bluetooth, WiMax (e.g., IEEE 802.16-2004, LAN/MAN Broadband Wireless LANS), Global Positioning System (GPS), spread spectrum (e.g., 900 MHz), and other radio frequency (RF) telephony purposes. The illustrated mobile platform 10 also includes mass storage (e.g., hard disk drive/HDD, optical disk, flash memory, programmable read only memory/PROM) 26 and one or more user interface (UI)

devices (e.g., touch screen, liquid crystal display/LCD, light emitting diode/LED, keyboard, mouse, etc.) 28 capable of enabling a user to interact with and perceive information from the mobile platform 10. The mobile platform 10 could also be "UI-less" such as in the case of machine-to-machine configurations (e.g., a device to track GPS location on a truck in which Wi-Fi is enabled when the truck arrives at a depot to transmit the logged data).

Figure 2:
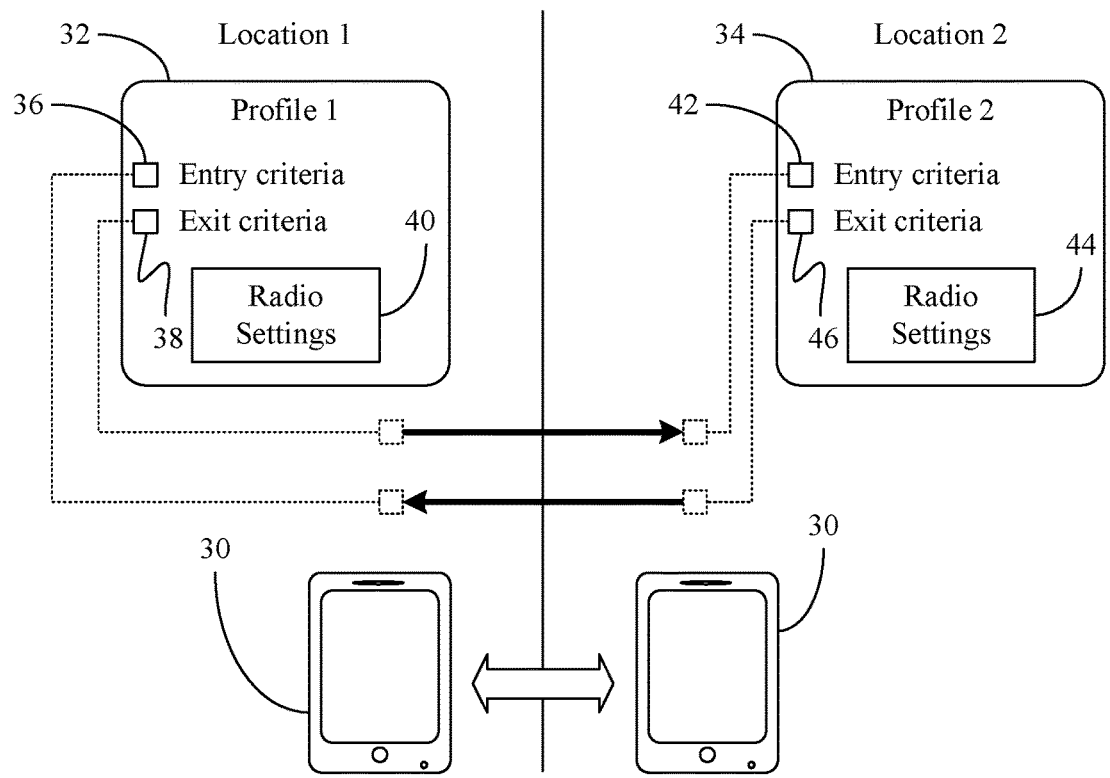
FIG. 2 is a block diagram of an example of a power management scheme according to an embodiment.

FIG. 2 shows a power management scheme in which a mobile platform 30 is used in, and travels between, multiple locations (e.g., first location—"Location 1", and second location—"Location 2"). Thus, the mobile platform 10 (FIG. 1), already discussed, may be readily substituted for the illustrated mobile platform 30. For example, the mobile platform 30 might be carried between the first location, which could be the user's home, and the second location, which could be the user's vehicle, wherein a first profile ("Profile 1") 32 is associated with the first location and a second profile ("Profile 2") 34 is associated with the second location. The profiles 32, 34 may be established and/or maintained on the mobile platform 30, wherein additional profiles associated with other locations such as work locations, urban (e.g., city) locations, rural locations, alternate locations (e.g., "not home"), and so forth, may also reside on the mobile platform 30. The setup of the profiles 32, 34 could involve prompting a user for certain up front configuration information such as addresses (e.g., work/home), frequent destinations (e.g., train stations, airports, Internet cafes), user preferences, etc. In the illustrated example, each profile 32, 34 has one or more entry and exit criteria, as well as radio settings to manage the radio based power consumption of the mobile platform 30.

In particular, the first profile 32 may include radio settings 40 that indicate which radios should be activated/deactivated when the mobile platform 30 enters and exits the first location. For example, the radio settings 40 could call for a cellular radio and a Wi-Fi radio of the mobile platform 30 to be activated, and for a Bluetooth radio and GPS radio of the mobile platform 30 to be deactivated in the first location, wherein deactivating the Bluetooth and GPS radios may reduce power consumption and extend the battery life of the mobile platform 30. In addition, the illustrated first profile 32 includes one or more entry criteria 36 that define the conditions required for a conclusion to be reached that the mobile platform 30 has entered the first location. For example, the entry criteria 36 may include a range of GPS coordinates that encompass a home address corresponding to the first location.

Similarly, the first profile 32 can include one or more exit criteria 38 that define the conditions required for a conclusion to be reached that the mobile platform 30 has exited the first location. Thus, the exit criteria 38 might indicate a connection loss with respect to a Wi-Fi radio. In this regard, the entry and exit criteria 36, 38 may take into consideration which radios are activated and which radios are deactivated so that the mobile platform 30 relies upon location information that is available at the moment in question. For example, in the above-described scenario, the entry criteria 36 can involve the use of the GPS radio rather than the Wi-Fi radio since the Wi-Fi radio may be deactivated as the mobile platform 30 enters the first location. The exit criteria 38, on the other hand, may use information from the Wi-Fi radio rather than the GPS radio since the GPS radio may be deactivated as the mobile platform 30 exits the first location. Alternatively, the mobile platform 30 could activate one or more inactive radios in order to obtain the appropriate location information. In addition, the mobile platform 30 may compare the location information to other information such as map information in order to determine the location of the mobile platform 30. For example, mapped roads, places of business, residences, train track/stations and other places of interest may all be used in conjunction with the radio information to determine the location of the mobile platform 30.

The second profile 34 may also include one or more entry criteria 42 that define the conditions required for reaching a conclusion that the mobile platform 30 has entered the second location, wherein the entry criteria 42 determination may be triggered by the satisfaction of the exit criteria 38 for the first profile 32. For example, in the case of the second location being a vehicle, upon determining that the Wi-Fi connection has been lost, the mobile platform 30 could evaluate the entry criteria 42 (and/or the entry criteria of any other established profiles) based on location information (e.g., cellular triangulation and/or density data) available from any active (e.g., powered on) radios. Moreover, the mobile platform 30 could retrieve previously stored location information (e.g., GPS coordinates) and/or activate one or more inactive radios (e.g., GPS radio) in order to obtain enough location information to determine whether the entry criteria 42 have been satisfied.

If the illustrated entry criteria 42 are satisfied, one or more radio settings 44 tailored for the second location may be implemented. For example, the radio settings 44 could call for activating a Bluetooth radio and a GPS radio, and deactivating the Wi-Fi radio, wherein deactivating the Wi-Fi radio may reduce power consumption and extend battery life. The illustrated profile 34 also includes one or more exit criteria 46 that define the conditions required for a conclusion to be reached that the mobile platform 30 has exited the second location. Thus, the exit criteria 46 might indicate a connection loss with respect to the Bluetooth radio, which may be active in the second location.

It can also be determined upon exiting either the first location or the second location that the mobile platform 30 has not entered a location having an associated profile. In such a case, the mobile platform 30 might institute default radio settings that are not associated with any particular location or profile.

Figure 3:
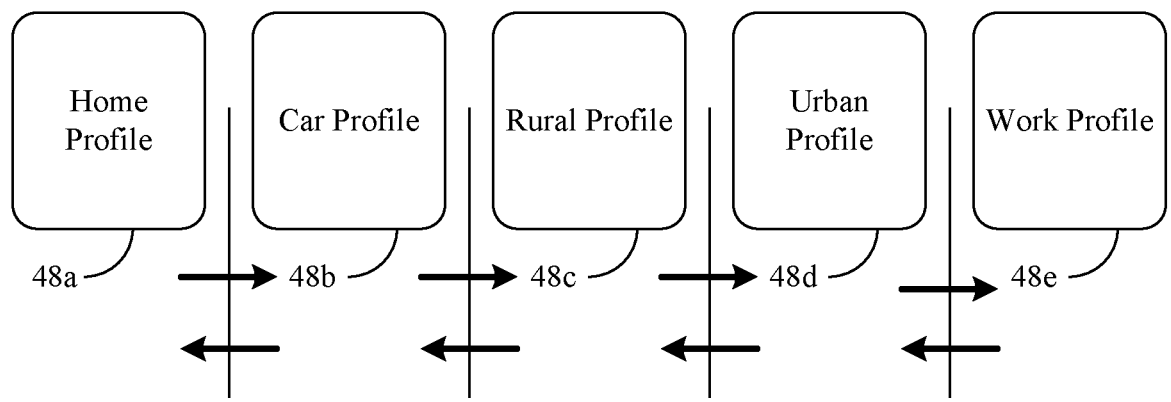
FIG. 3 is a block diagram of an example of a plurality of location profiles according to an embodiment.

FIG. 3 shows a scenario in which a plurality of profiles 48 (48a-48e) are used to manage the radio based power of a mobile platform that may travel between various locations. In the illustrated example, a home profile 48a, a car profile 48b, a rural profile 48c, an urban profile 48d, a work profile 48e, and so forth, may be invoked using location information from one or more of the active radios on the mobile platform. The location information may include, but is not limited to, connection loss information, GPS coordinate information, cellular triangulation information, cellular density information, and so on. Moreover, the profiles 48 may be constructed from user input, historical data, map data, radio data, etc., or any combination thereof. Table I below shows an example of the radio settings that might be associated with the profiles 48.

TABLE I

| Radio | Home Profile | Car Profile | Rural Profile | Urban Profile | Work Profile |
|---|---|---|---|---|---|
| 2 G | ON | ON | ON | ON | ON |
| 3 G | OFF | ON | ON | ON | OFF |
| Wi-Fi | ON | OFF | OFF | ON | ON |

TABLE I-continued

| Radio | Home Profile | Car Profile | Rural Profile | Urban Profile | Work Profile |
|---|---|---|---|---|---|
| Bluetooth | OFF | ON | OFF | OFF | OFF |
| GPS | OFF | ON | ON | ON | OFF |

Figure 4:
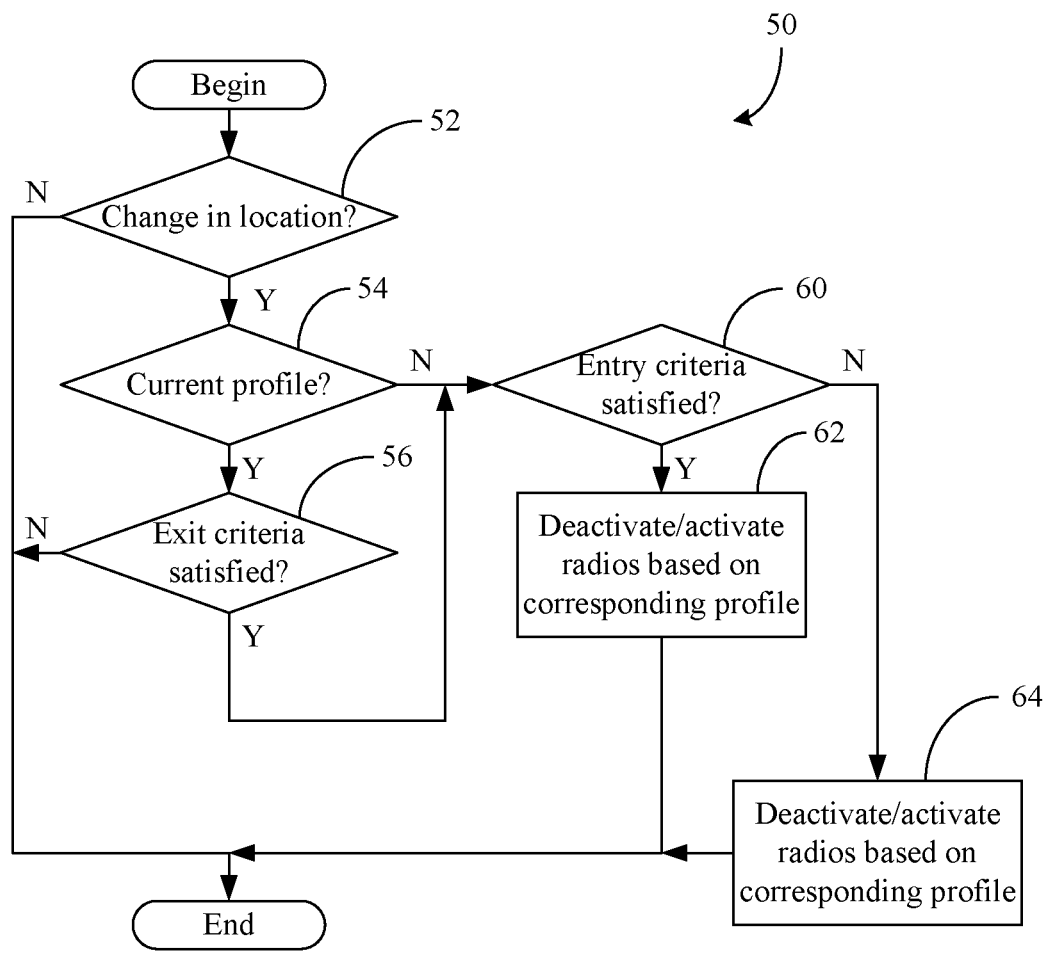
FIG. 4 is a flowchart of an example of a method of managing radio settings for a mobile platform according to an embodiment.

FIG. 4 shows a method 50 of managing radio settings for a mobile platform. The method 50 might be implemented in logic 16 (FIG. 1) of a mobile platform such as mobile platform 10 (FIG. 1) or mobile platform 30 (FIG. 2) as a set of logic instructions stored in a machine- or computer-readable storage medium such as random access memory (RAM), read only memory (ROM), programmable ROM (PROM), firmware, flash memory, etc., in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in method 50 may be written in any combination of one or more programming languages, including an object oriented programming language such as Java, Smalltalk, C++ or the like and conventional procedural programming languages, such as the "C" programming language or similar programming languages.

Processing block 52 provides for determining whether a change in location has occurred with respect to the mobile platform. As already noted, location changes may be detected based on absolute (e.g., GPS, 2G/3G triangulation) location information, relative (e.g., proximity to Wi-Fi access point/paired Bluetooth device) location information, or any combination thereof. Other radio provided information such as current speed (e.g., GPS based) could also be used to supplement the illustrated decision making process. If a location change is detected, illustrated block 54 determines whether a radio based location profile such as profiles 32, 34 (FIG. 2) or profiles 48 (FIG. 3), is currently active. If a location profile is currently active, a determination may be made at block 56 as to whether the exit criteria for the profile have been satisfied. If so, illustrated block 60 determines whether the entry criteria have been satisfied for another location profile. Thus, block 60 could involve obtaining location information (e.g., connection loss information, GPS location information, etc.) and evaluating the entry criteria for one or more profiles (e.g., work profile, car profile) based on the location information.

If the entry criteria of a location profile are satisfied, one or more radios on the mobile platform can be activated and/or deactivated at block 62 based on the radio settings contained in the profile whose entry criteria are met. Block 62 could also involve re-configuring one or more radios into a different mode such as a low power (e.g., reduced scanning) mode, and so forth. Illustrated block 64 provides for configuring, activating and/or deactivating one or more radios on the mobile platform based on the radio settings of a default profile if no particular entry criteria are satisfied.

Thus, when information from the radios of a mobile platform indicate that the platform has entered a particular location profile, the radios needed for that location profile may be automatically turned on and the radios not needed for that profile may be automatically turned off to save power. As a result, the battery life of the mobile platform can be extended, and the overall user experience may be enhanced.

Embodiments described herein are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A non-transitory computer readable storage medium comprising a set of instructions which, when executed by one or more processors, cause a mobile system to:

prompt a user to enable activating at least three radios from a plurality of radios in response to a change in location, wherein the plurality of radios includes one or more Wi-Fi radios, cellular radio, and a Bluetooth radio, wherein the change in location includes the mobile system leaving the location, reaching the location, or entering a new location;
identify a location;
activate the at least three radios by turning the at least three radios on in response to the mobile system reaching the location; and
automatically and selectively deactivate at least one of the three radios by selectively turning off the cellular radio, while keeping the Bluetooth radio and the Wi-Fi radio on, in response to the mobile system leaving the location,
wherein leaving the location is indicated by a connection loss with respect to the Bluetooth radio,
wherein the Wi-Fi radio is part of an access point, and
wherein the change in location is based on a proximity to the access point.

2. The non-transitory computer readable storage medium of claim 1, wherein the mobile system is to identify the location using GPS coordinate information.

3. The non-transitory computer readable storage medium of claim 1, wherein the set of instructions, when executed, cause the mobile system to activate at least one of a plurality of radios in response to change in the location.

4. The non-transitory computer readable storage medium of claim 1, wherein the instructions, when executed, cause the mobile system to compare the location to map information.

5. The non-transitory computer readable storage medium of claim 1, wherein the at least one of an entry criteria and an exit criteria is to be associated with the location.

6. The non-transitory computer readable storage medium of claim 1, wherein a logic is to place at least one of a plurality of radios in a low power mode in response to the change in the location.

7. The non-transitory computer readable storage medium of claim 1, wherein the instructions, when executed, cause the mobile system to prompt the user to configure a profile associated with deactivating the at least one of two radios in response to a change in location.

8. A non-transitory computer readable storage medium comprising a set of instructions which, when executed by one or more processors, cause a mobile system to:
prompt a user to configure a profile associated with activating a Wi-Fi radio of one or more Wi-Fi radios in response to a change in location, wherein the change in location includes leaving the mobile system the location, reaching the location, or entering a new location;
identify a location;
activate the Wi-Fi radio, according to the profile, by turning the Wi-Fi radio on in response to the mobile system reaching the location; and
automatically and selectively deactivate one or more of the Wi-Fi radios, according to the profile, by selectively turning the one or more of the Wi-Fi radios off, while keeping a Bluetooth radio on and a cellular radio on, in response to the mobile system leaving the location,
wherein leaving the location is indicated by a connection loss with respect to the Bluetooth radio,
wherein the Wi-Fi radio is part of an access point, and
wherein the change in location is based on a proximity to the access point.

9. The non-transitory computer readable storage medium of claim 8, wherein the mobile system is to identify the location using GPS coordinate information.

10. A non-transitory computer readable storage medium having, a set of instructions, that when executed by one or more processors, cause a mobile system to:
identify a location;
activate at least two radios from a plurality of radios by turning the at least two radios on in response to the mobile system reaching the location, wherein the plurality of radios includes one or more of Wi-Fi radio, cellular radio and a Bluetooth radio;
prompt a user to configure a profile associated with deactivating at least one of the two radios in response to a change in the location, wherein the change in location includes the mobile system leaving the location, reaching the location, or entering a new location; and
selectively deactivate the at least one of the two radios by selectively turning the Wi-Fi radio off, while keeping the Bluetooth radio on and the cellular radio on, in response to the mobile system leaving the location,
wherein leaving the location is indicated by a connection loss with respect to the Bluetooth radio,
wherein the Wi-Fi radio is part of an access point, and
wherein the change in location is based on a proximity to the access point.

11. The non-transitory computer readable storage medium of claim 10, wherein the mobile system is to identify the location using GPS coordinate information.

12. A mobile device comprising:
at least two radios from a plurality of radios, wherein the plurality of radios includes one or more Wi-Fi radio, cellular radio and a Bluetooth radio;
a display; and
a processor communicatively coupled to the display and the Wi-Fi and Bluetooth radios, wherein the processor is to:
prompt a user to enable activation of the at least two radios in response to a change in location, wherein the change in location includes the mobile device leaving the location, reaching the location, or entering a new location;
activate the at least two radios, wherein to activate the at least two radios the processor is to turn the at least two radios on in response to the mobile device reaching the location; and
automatically and selectively deactivate at least one of the Wi-Fi, cellular or Bluetooth radios, wherein to automatically and selectively deactivate the at least one of the Wi-Fi, cellular, or Bluetooth radios the processor is to selectively turn the at least one of the Wi-Fi, cellular, or Bluetooth radios off in response to the mobile device leaving the location, wherein the Bluetooth radio is kept on and the cellular radio is kept on, in response to the mobile device leaving the location,
wherein leaving the location is indicated by a connection loss with respect to the Bluetooth radio, wherein the Bluetooth radio is communicatively coupled to the processor,
wherein the Wi-Fi radio is part of an access point, and
wherein the change in location is based on a proximity to the access point.

13. The mobile device of claim 12, wherein the location is associated with a GPS coordinate system.

14. The mobile device of claim 12, wherein each of the plurality of radios supports a different wireless technology.

15. The mobile device of claim 12, wherein the change in location is based on information received from one or more active radios of the plurality of radios on the mobile device including the connection loss.

\* \* \* \* \*